No. 666,969. Patented Jan. 29, 1901.
T. L. McKEEN.
DRAW BAR ATTACHMENT.
(Application filed Sept. 22, 1900.)
(No Model.) 3 Sheets—Sheet 3.
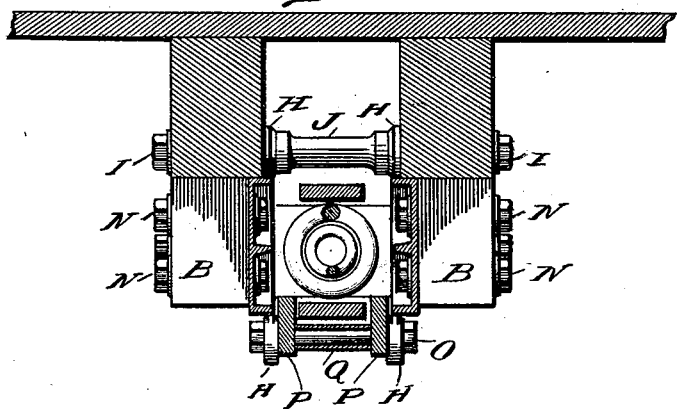
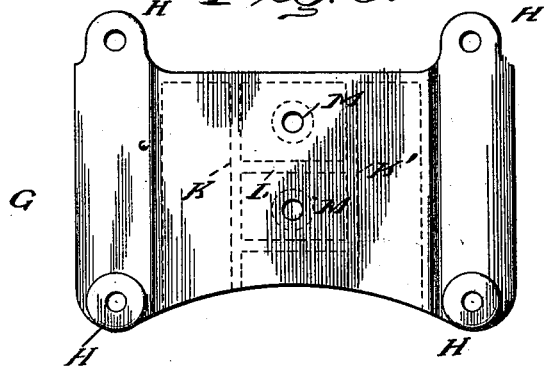
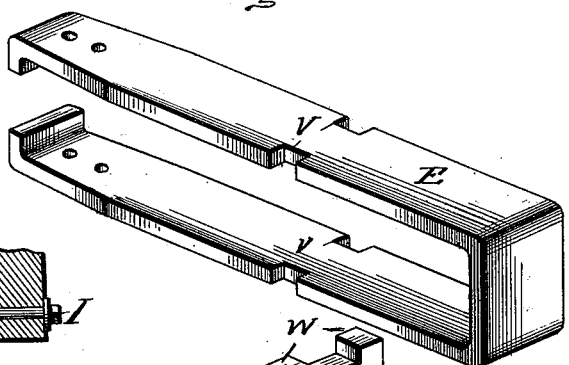
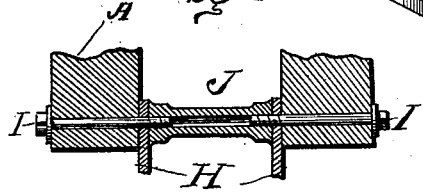

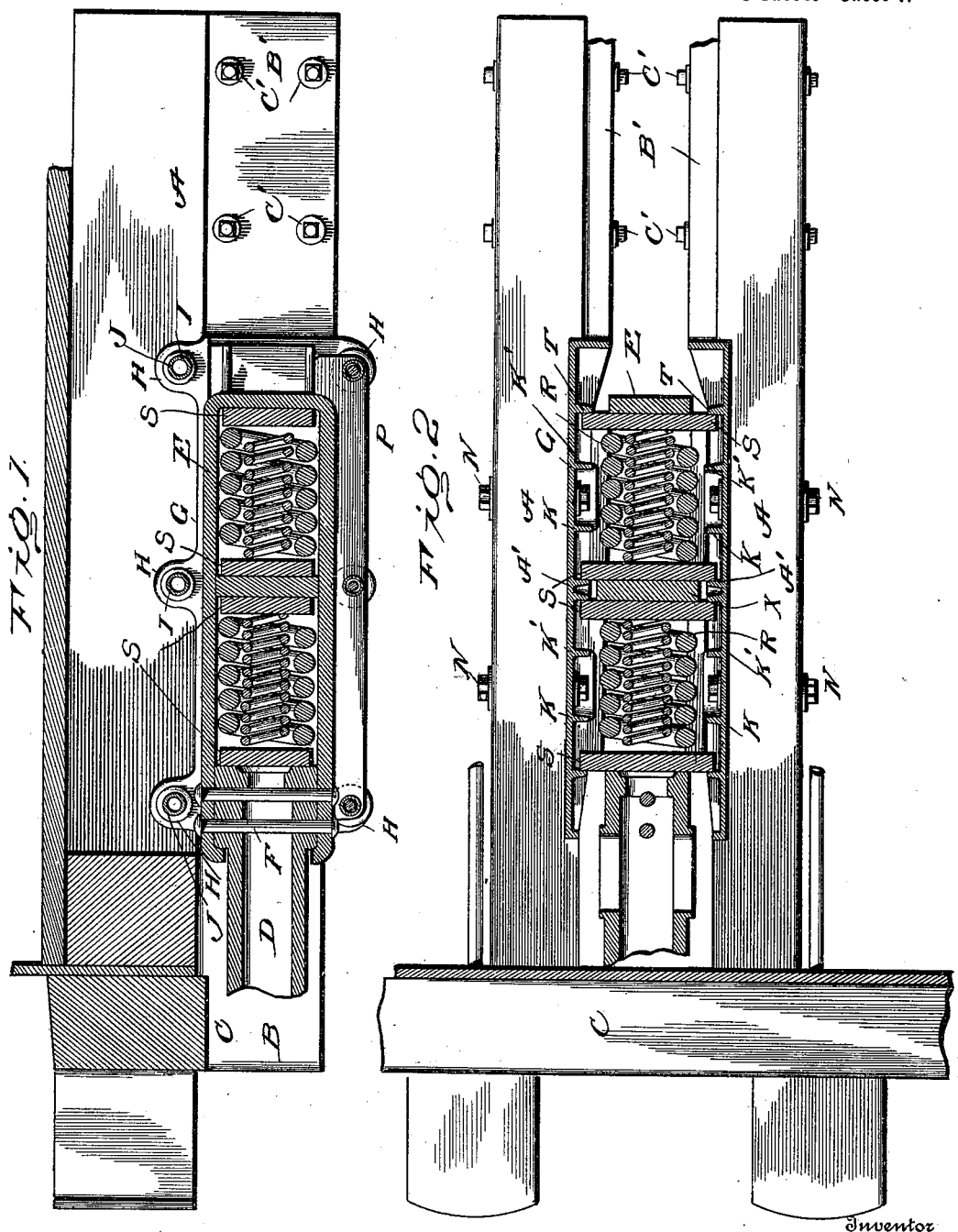

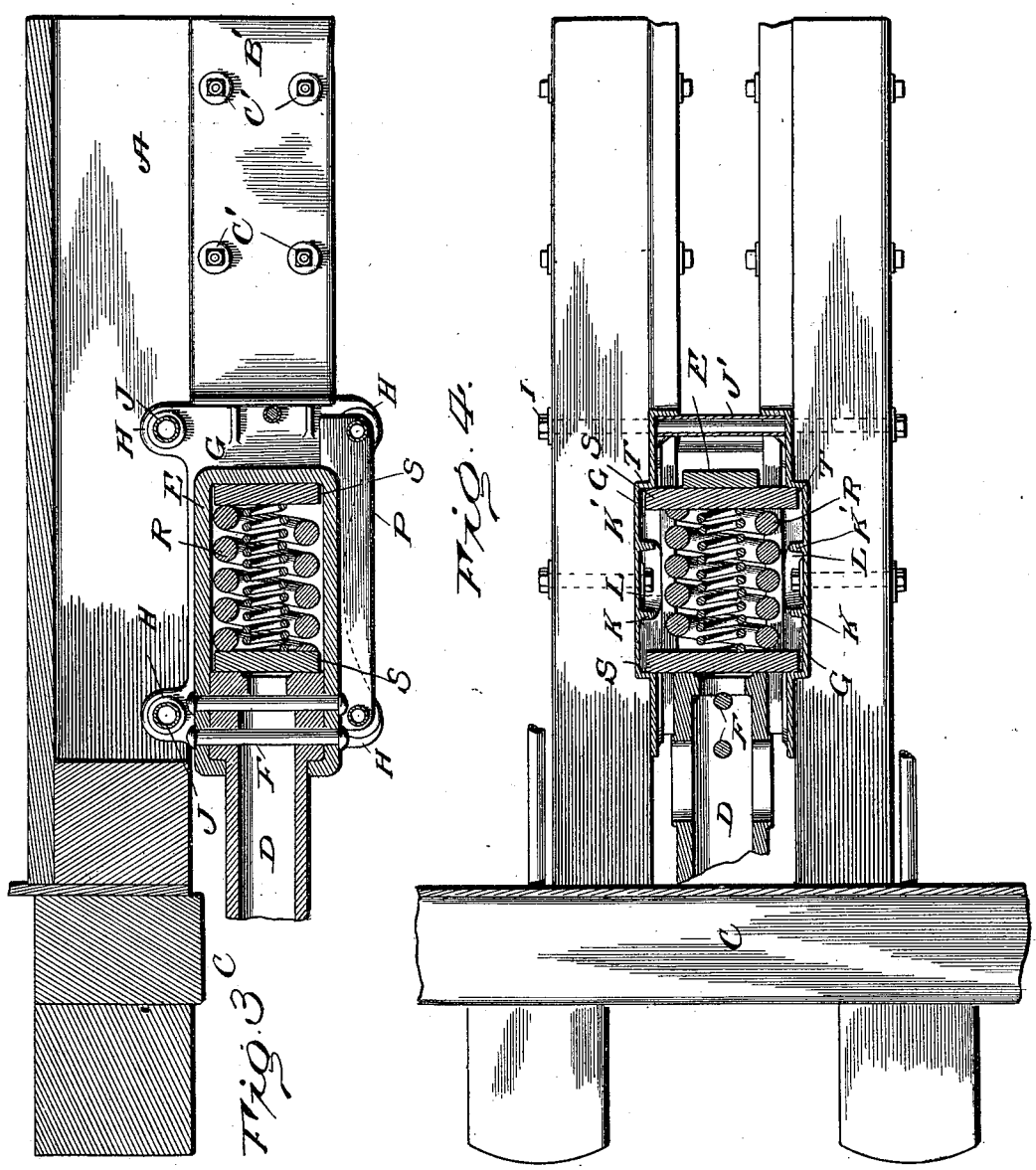

UNITED STATES PATENT OFFICE.

THOMAS L. McKEEN, OF EASTON, PENNSYLVANIA.

DRAW-BAR ATTACHMENT.

SPECIFICATION forming part of Letters Patent No. 666,969, dated January 29, 1901.

Application filed September 22, 1900. Serial No. 30,800. (No model.)

*To all whom it may concern:*

Be it known that I, THOMAS L. MCKEEN, a citizen of the United States, residing at Easton, in the county of Northampton and State of Pennsylvania, have invented certain new and useful Improvements in Draw-Bar Attachments; and I do hereby declare the following to be a full, clear, and exact description of the invention, such as will enable others skilled in the art to which it appertains to make and use the same.

My invention relates to certain new and useful improvements in draw-bar or draft-rigging attachments for railroad-cars.

My invention has for one object to provide a simple and effective means for absorbing or taking up the momentum shock or blow which is imparted to draw-bars and their attachments as the cars are forced together or pulled apart and to provide a construction which, while provided with tandem springs, may not only be readily repaired when occasion requires, but may be made operative with a single spring when it becomes necessary to utilize the parts of the ordinary single-spring draw-bar attachments such as are at present in use.

My invention has for a further object to secure the greatest degree of strength with a minimum degree of weight.

With these ends in view my invention consists of the details of construction and arrangement hereinafter more fully described.

In order that those skilled in the art to which my invention appertains may fully understand the same, I will proceed to describe in detail the construction, arrangement, and advantages of my improvements, referring by letters to the accompanying drawings, in which—

Figure 1 is a longitudinal section on the line 1 1 of Fig. 2 and showing my improved attachment. Fig. 2 is a horizontal section on the line 2 2 of Fig. 1 with the subsills shown in plan. Fig. 3 is a view similar to Fig. 1, but showing a single-spring construction, but involving details of construction common to it and the tandem construction. Fig. 4 is a horizontal section taken on the line 3 3 of Fig. 3, but with the subsills in plan. Fig. 5 is a vertical cross-section on the line 4 4 of Fig. 1. Fig. 6 is a side view or elevation of one of the improved side plates or spring-housings. Fig. 7 is a perspective view of the draw-bar yoke and central bridge or filling-piece, the latter removed from its seat in the yoke; and Fig. 8 is a detail longitudinal section of the filler-pieces interposed between the upper lugs of the side plates and into which the securing screws or bolts enter.

Similar letters of reference denote like parts in the several figures of the drawings.

A represents the longitudinal sills of the car, B the subsills, and C the end sill.

D is the draw-head, and E is the yoke, secured to the rear end thereof by rivets or bolts F.

Side plates or housings G, which I especially construct with lugs or ears H, are secured to the sills A by bolts I, which pass through the sills A and are screwed into hollow tubular filling-pieces J, which bridge the space between the opposite lugs of the side plates, as clearly shown at Fig. 5. This construction and arrangement enables me to dispense with a single long bolt and a tubular brace or washer, which is somewhat impracticable on account of the difficulty in putting a long bolt into position, owing to the nearness of the adjacent outer sills.

In addition to the lugs H the side plates are formed with vertical ribs K K' to constitute stops against which the spring-followers abut, as will be hereinafter fully described, and also with a longitudinal rib L, which constitute lateral guides to hold the springs in proper position and serve as a substitute for the more expensive and complicated centering-piece which usually is secured to or passes through the follower and into the coil of the springs. Each side of the rib L are bolt-holes M, through which pass bolts N and by means of which the plates G are firmly secured to the subsills B.

Through the lower lugs H of the plates G pass bolts O, and said bolts pass through the ends of carry-plates P and interposed tubular washers Q, as clearly shown at Fig. 5. The carry-plates P extend up each side of the yoke E, as best shown at Figs. 4 and 5, and constitute supports for the followers.

When the side plates G are designed for use with tandem springs, they are formed with three lugs at the upper and lower edges, and when they are designed for use with one spring, as shown at Figs. 3 and 4, they are formed with two lugs, and, as will be obvious, if the two front bolts O are removed in the former construction or the one front bolt in the latter the carry-plates are free to swing downwardly upon the rear bolt as a pivot, and thus release the springs and followers, which may be taken out for repair or substitution, and also enable the draw-head and yoke to be removed. The followers S are in view of this construction of simple rectangular shape, easy of construction and adjustment, and cheap. In the single-spring construction two followers S are employed and in the tandem construction four are employed. In the single construction, as clearly shown, a follower is arranged at each end of the spring and in normal condition the rear follower is held against the rear shoulder or offset T of the side plates G, while the forward follower is held against similar shoulders or offsets U, and when the draw-head is forced backward against the spring by the forward follower, against which the rear end of the draw-head abuts, the spring yieldingly resists this action of the draw-head and until the forward follower reaches and its movement is stopped by the inwardly-projecting vertical ribs K on the plates G, and as the draw-head is pulled outwardly the yoke pulls the rear follower against the spring and until said follower contacts with the vertical ribs K' of the side plates. In the tandem construction the yoke E is made longer than in the single construction and is formed with centrally-located mortises V, (see Fig. 7,) adapted to receive tenons or projections W formed on the bridge or filler X, which is placed in position in an obvious manner before the yoke is riveted or secured to the rear end of the draw-head, and in this tandem construction the side plates G are formed with central vertical ribs A', against which the rear follower of the front spring and the forward follower of the rear spring respectively abut, as clearly shown at Fig. 2, and, as seen at this figure, the side plates G are similar in every other respect to those used in the single construction, or, in other words, constitute two in one, and as rendered necessary by the use of two springs. The rear ends of the side plates are braced against suitable timbers B', secured by bolts C' to the subsills B. In the tandem construction it will be seen that both springs coöperate to take up the momentum shock, the rear follower of the forward spring being supported against the central rib A' and the rear follower of the rear spring against the offsets or shoulders T, while in the forward movement of the draw-bar the forward followers are supported, respectively, against the front offset and central rib.

From the construction shown and described it will be seen that although the yoke and side plates of the tandem form are designed for the use of two springs nevertheless a single spring may be used when for any reason it becomes necessary to do so and that said single spring may be located within either the front or rear portion of the yoke and side plates. It will also be seen that the construction is exceedingly simple and readily secured in place or removed and that when in place the construction is very strong and durable.

Having described the construction and operation of my improved draw-bar attachment, what I claim as new, and desire to secure by Letters Patent, is—

1. In a draw-bar or draft-rigging attachment, for railroad-cars, the combination with the side sills and subsills and the draw-bar provided with a rearwardly-extended yoke, side plates provided with ears or lugs at each edge and vertical and horizontal ribs to constitute respectively follower-stops and spring-retainers, screw-bolts passing through the side sills and the upper lugs of the side plates, filling-pieces or spreaders interposed between the lugs and threaded to receive the screw-bolts, screw-bolts passing through the side plates between the vertical ribs thereof and through the subsills, followers located within the draw-bar yoke and side plates, carry-plates each side of the yoke and below springs interposed between the followers, screw-bolts passing through the lower lugs of the side plates and the carry-plates, and tubular washers surrounding the bolts and interposed between the carry-plates, substantially as and for the purposes set forth.

2. In a draw-bar or draft-rigging attachment, and in combination with the draw-bar having a rearwardly-extended yoke and adapted to receive springs and followers, side plates secured to the subsills by bolts and to the side sills by short bolts threaded into the opposite ends of filling-pieces or spreaders located between the side plates, substantially as hereinbefore set forth.

3. In a draw-bar attachment, in combination with cheek-plates secured to the side sills and subsills and formed with vertical ears on the lower edge near each end and extending below the subsills, a draw-bar provided with a yoke and with followers and springs located within the same, carry-plates supporting the followers and secured to the ears on the cheek-plates at each end, by a single bolt with a tubular washer surrounding each bolt and interposed between the carry-plates, substantially as and for the purpose set forth.

4. In a draft-rigging attachment such as described, the side plates formed with vertical ribs or stops each side of the center and intermediate central ribs A', the draw-bar yoke mortised centrally on each edge, a centrally-disposed partition-plate provided with tenons fitting the mortises in the edges of the yoke, springs each side of the partition-plate, follower-plates at each end of the springs, and means for holding the springs in place, substantially as described.

5. In combination with the side sills and subsills, side plates secured to the subsills and provided with upwardly-projecting lugs secured to the side sills by bolts passing through the side sills and lugs, and threaded into filling-pieces located between the lugs of the side plates, substantially as and for the purpose set forth.

In testimony whereof I affix my signature in presence of two witnesses.

THOMAS L. McKEEN.

Witnesses:
SIDNEY S. UNDERWOOD,
JOHN F. O'CONNOR.